Sept. 23, 1930.                    D. K. BLAKE                    1,776,719
                            ELECTRICAL DISTRIBUTION SYSTEM
                              Original Filed Dec. 8, 1925
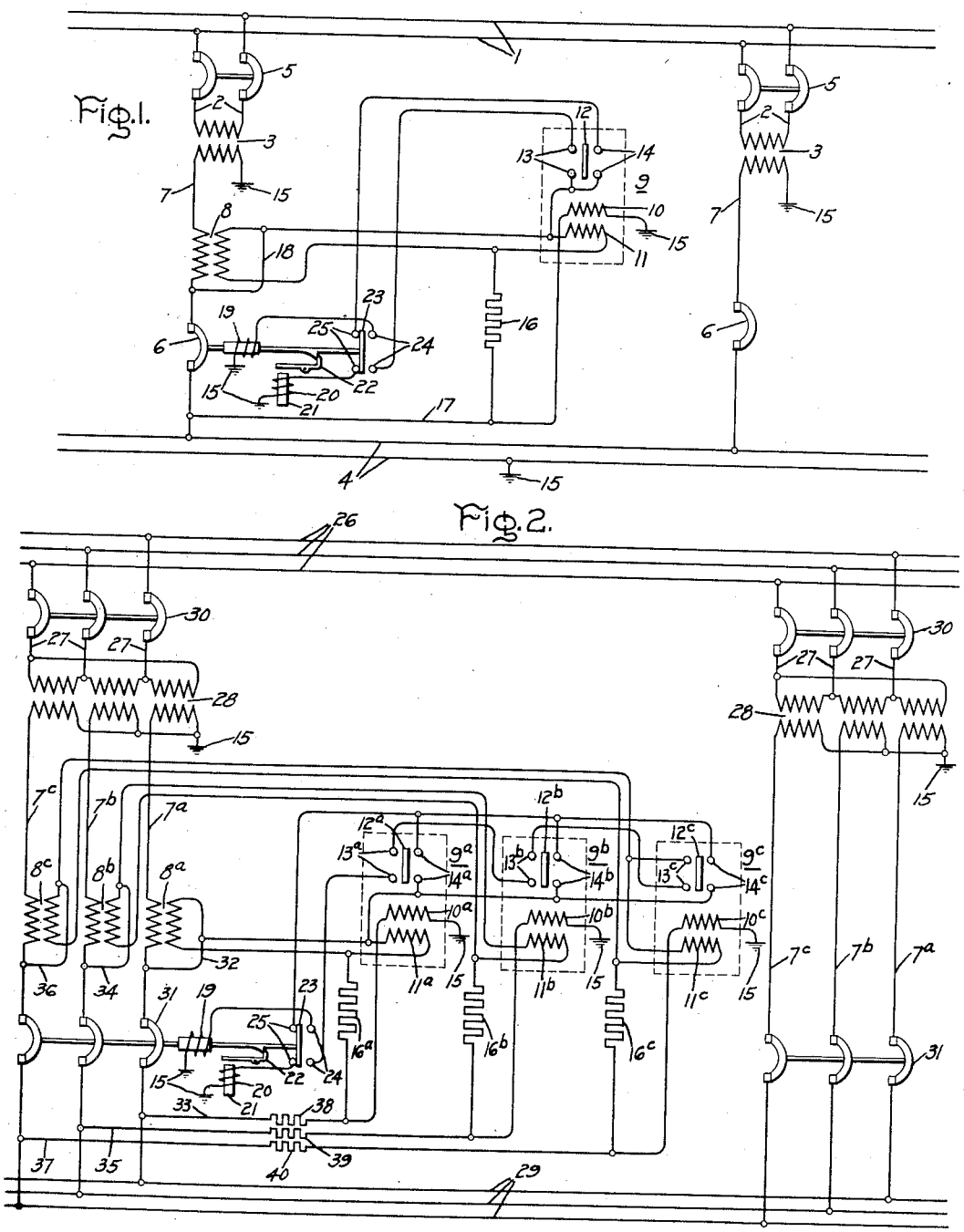
Inventor:
David K. Blake,
by  *Alexander S. Smith*
His Attorney.

Patented Sept. 23, 1930

1,776,719

UNITED STATES PATENT OFFICE

DAVID K. BLAKE, OF SCHENECTADY, NEW YORK, ASSIGNOR TO GENERAL ELECTRIC COMPANY, A CORPORATION OF NEW YORK

ELECTRICAL DISTRIBUTION SYSTEM

Application filed December 8, 1925, Serial No. 74,188. Renewed March 10, 1930.

My invention relates to electrical distribution systems, and particularly to alternating current distribution systems in which high voltage feeders supply distribution transformers interconnected on their low-voltage sides to form a network.

In an alternating current distribution system provided with a plurality of high-voltage feeders, a failure of one of the feeders does not necessarily cause a failure of load supply to the network, since the sound feeders may be capable of maintaining continuity of service. However, if a feeder is disconnected at its source of supply or a short circuit occurs in the feeder, a reversal of energy flow will occur in that feeder as a result of the network supplying the magnetizing current for the transformer, or as a result of the network feeding power into a fault or short circuit on the feeder. It then becomes necessary to disconnect the distribution transformer to prevent feed back of energy from the network, not only upon a reversal of energy flow due to the network feeding into a fault or short circuit on the feeder but upon a reversal of energy flow due to the magnetizing current fed from the network when the feeder is disconnected at its source of supply. It is also desirable to reconnect the distribution transformer to the network when normal conditions have been restored.

Difficulties have arisen in providing a mechanism, which is simple and reliable in operation, to disconnect the distribution transformer from the network on reverse energy flow because of the great range of current values encountered, namely, the comparatively small value of magnetizing current and the high value of current due to a fault or short circuit fed from the network.

It is, therefore, an object of my invention to provide an improved means, which is simple, sensitive, and reliable in operation, for disconnecting distribution transformers from a network on a reversal of energy flow and reconnecting the transformers to the network when normal conditions have been restored.

For the purpose of explaining the present invention it has been illustrated in the accompanying drawing as applied to an alternating-current distribution system with an interconnected secondary system, but it will be understood that it may be applied to other systems of electric distribution, and in general to two interconnected alternating-current circuits subject to a reversal of energy flow between the circuits.

In accordance with my invention, as applied to an alternating current network system, a circuit breaker in a feeder is controlled by a power directional relay to effect the connection and disconnection between a distribution transformer secondary and the network in accordance with the direction of current flow in the transformer secondary. The power directional relay is provided with two main operating windings, one of which is normally arranged to be energized in accordance with the voltage of the network and the other of which is arranged to cooperate with the voltage responsive winding and is so connected that all of the turns are effective, either when the circuit breaker is closed or when the circuit breaker is open. This winding is connected to an inductive apparatus, such as a current transformer, in a feeder to the secondary system, and is energized in accordance with the direction of current flow in the current transformer when the circuit breaker is closed. The winding is also connected directly in a circuit between the transformer secondary and the network when the circuit breaker is open and is energized in accordance with the direction of current flow resulting from the difference in magnitude and phase of the voltage between the transformer secondary and the network. The arrangement and connection of this winding eliminates the necessity of using two current coils, one which is effective when the circuit breaker is closed and another which provides an operating torque when the circuit breaker is open. The elimination of a second coil obviates any difficulty which may arise due to the magnetic interaction between two current coils in mutual inductive relation, while the arrangement of the single coil, conductively energized when the circuit breaker is open by the voltage between the circuits, eliminates additional apparatus to energize the current coil. The whole arrangement, therefore, embraces simplicity in the number of parts required and provides an apparatus which is sensitive and highly responsive either with a reverse current due to a magnetizing current, or with a much larger value of reverse current encountered when the network is feeding into a fault or short circuit on the feeder.

The novel features which I believe to be characteristic of my invention are set forth with particularity in the appended claims, the invention itself, however, both as to organization and method of operation together with further objects and advantages thereof will be best understood by reference to the following description taken in connection with the accompanying drawing in which Fig. 1 is a schematic illustration of a single phase alternating current distribution system in which my invention has been embodied; and Fig. 2 represents an arrangement embodying my invention suitable for a polyphase system of distribution.

Referring to Fig. 1 of the drawing, 1 indicates the primary high-voltage mains of a distribution system connected to high-voltage feeders 2, supplying distribution transformers 3, which are interconnected on their low-voltage sides by the distributing network 4. Circuit breakers 5 of any suitable type are inserted in the main feeders 2, while network circuit breakers 6 are provided in the low-voltage mains 7 connected to the secondary of the distribution transformers. In order to simplify the disclosure, only one feeder is shown equipped with the apparatus for effecting the automatic disconnection and reconnection of the transformer secondary, but it will of course be understood that each feeder or any desirable number of feeders, may be similarly equipped. An inductive apparatus, such as a current transformer 8, is inserted in series with the circuit breaker 6 which is controlled by a network relay 9 of the power-directional type. The relay 9 is shown as comprising a voltage coil 10, a current coil 11, a contact 12 and contact points 13 and 14. The current transformer 8 is arranged to saturate at a low value of load current so as to limit the voltage impressed on the current coil 11 and prevent excessive heating under any value of load current attained during the operation of the system.

For simplicity of illustration, I have shown a secondary network which has one side thereof permanently connected to ground 15. One terminal of voltage coil 10 is grounded at 15 while the other terminal thereof is connected to the ungrounded side of the network. The current coil 11 is connected across the secondary of the current transformer 8 and is also connected by conductors 17 and 18 across the switch 6 through an impedance, shown as a resistance 16, which is provided to limit the current through the current coil 11 when circuit breaker 6 is open. The coil 11 is connected to the secondary of the current transformer 8 and across the switch 6 in such a manner that the current in the transformer secondary and the current through the resistor 16 flow through the coil in the same direction. The coil 11 is referred to herein as a current coil in order to differentiate clearly from the voltage coil 10, but from the description hereafter it will be apparent that the coil though responsive to current might be considered a voltage coil when the circuit breaker 6 is open, since it is subjected to the difference in voltage resulting from the difference in magnitude and phase of the voltage between the transformer secondary and the network. Circuit breaker 6 is provided with closing and opening means shown as comprising a closing coil 19, and an opening coil 20 having a plunger 21 to disengage a latch 22 which holds the breaker closed when it is desired to have the distribution transformer connected to the network. The circuit breaker 6 is also provided with auxiliary switching means shown as a contact 23 having contact points 24 and 25 to provide a control for completing the circuit for the opening or closing coils when circuit breaker 6 is in the closed or open position.

The closing coil 19 is arranged to be connected to the circuit breaker side of current transformer 8 through contact points 24, contact points 13, and conductor 18 in order to avoid a periodically opening and closing of the circuit breaker on an attempted reconnection. The closing coil 19 takes a comparatively large operating current and part of this current will be supplied from the network as soon as the tips of the circuit breaker touch the breaker contacts. If the closing coil were connected to the feeder between the current transformer and the transformer secondary, the current supplied by the network would flow through the current transformer 8 in the reverse direction and produce an opening torque in the power directional relay. It will also be observed that conductor 18 connects a terminal of current coil 11 between current transformer 8 and circuit breaker 6. When circuit breaker 6 is open the direct energization of current coil 11, due to the current flow in the series circuit between the transformer secondary and the network, is supplemented as a result of the energization of the current transformer by the series-circuit current, so that an additional torque is provided to move contact 12 to close its contact points 13.

With the above description of apparatus in mind, a better understanding of the various circuit conditions at different points of the cycle of operations may be obtained. Assume that the network is energized by means of one feeder and that the other feeder has been disconnected by moving circuit breakers 5 and 6 in that feeder to the open position. Voltage coil 10 will be energized from the net-work by a circuit from the ungrounded side of the network 4 through conductor 17, voltage coil 10, to the other side of the network which is connected to ground 15. Current coil 11 will be energized by a reverse current flow in a circuit from the ungrounded side of the network, through conductor 17, resistance 16, current coil 11, conductor 18, primary winding of current transformer 8, conductor 7, the secondary of transformer 3, to the ground 15. Contact 12 of relay 9 will now be subjected to an actuating torque which closes contact points 14.

If circuit breaker 5 is now closed, the primary of transformer 3 and thereby its secondary is energized from the supply mains 1. With circuit breaker 6 in the open position, current coil 11 is in a series circuit between the transformer secondary and the network, and is energized in accordance with the direction of current flow resulting from the difference in magnitude and phase of the voltage between the transformer secondary and the network. When the transformer voltage bears a certain relation to the network voltage, as for example, when it is slightly higher and in phase with the network voltage so as to permit energy flow from the transformer secondary to the network, the current coil 11 cooperating with the voltage coil 10 will move contact 12 to bridge its contact points 13. With the circuit breaker 6 in the open position and contact 23 bridging its contact points 24, a circuit will be completed through the closing coil 19 from the ungrounded terminal of the secondary of transformer 3, conductor 7, primary winding of transformer 8, conductor 18, contacts 12 and 13, contacts 23 and 24, coil 19, to the other terminal of the secondary of transformer 3 which is connected to a ground 15. Upon the energization of closing coil 19, circuit breaker 6 is moved to its closed position, and latch 22, takes its illustrated position and holds the breaker closed. As soon as circuit breaker 6 closes the power flow is from transformer 3 to the network and the secondary of current transformer 8 is energized in accordance with the load current, so that the current coil maintains contact 12 in engagement with contact points 13.

Now if feeder 2 is deenergized by opening circuit breaker 5, transformer 3 will take its magnetizing current from the network. Since the direction of energy flow is in the reverse direction, current transformer 8 will be energized in such a manner as to cause a reverse current flow in the current coil 11. The current coil cooperating with the voltage coil will now be instrumental in moving contact 12 to bridge its contact points 14. This movement of contact 12 completes a circuit for the opening coil 20, from the ungrounded terminal of transformer 3 through conductor 7, primary of transformer 8, conductor 18, contact 12, contact 23, coil 20, to the other terminal of the secondary of transformer 3 which is connected to ground 15. As soon as coil 20 is energized the plunger 21 is moved to a position to disengage latch 22 and circuit breaker 6 moves to its open position thereby breaking the circuit through the opening coil 20. This movement of the breaker causes its contact 23 to bridge the contact points 24 in the circuit of the closing coil 19. The current coil with a high resistance in series therewith is now the only connecting link between the deenergized feeder and the network. The same cycle of operations will take place for a reversal of energy flow due to a fault or short circuit in feeder 2.

If circuit breaker 5 is again closed and the conditions of potential, both as to magnitude and phase, are such as to permit energy flow from the transformer secondary to the network, the current coil 11 will be instrumental in moving contact 12 to bridge its contact points 13. A circuit is again completed for the closing coil 19, and circuit breaker 6 will be moved to its circuit closing position in the same manner as described before the reversal of energy flow.

In Fig. 2 a schematic diagram of connections has been shown for a three-phase distribution system, in which 26 indicates the primary high-voltage mains connected to high-voltage feeders 27, supplying distribution transformer banks 28, which are interconnected on their low-voltage sides by the distributing network 29. Circuit breakers 30, of any suitable type are inserted in the main feeders, while network circuit breakers 31 are provided in the low-voltage mains $7^a$, $7^b$, and $7^c$. Current transformers $8^a$, $8^b$, and $8^c$ are inserted in series in the low-voltage mains, $7^a$, $7^b$, $7^c$ respectively, and in series with circuit breaker 31 which is controlled by network relays $9^a$, $9^b$, and $9^c$ of the power-directional type. The relays $9^a$, $9^b$, and $9^c$ are shown as compromising, respectively, voltage coils $10^a$, $10^b$, and $10^c$, current coils $11^a$, $11^b$, and $11^c$, contacts $12^a$, $12^b$, and $12^c$, and contact points $13^a$ and $14^a$, $13^b$ and $14^b$, and $13^c$ and $14^c$. The distributing network has a grounded neutral so that one terminal of voltage coil $10^a$ is grounded at 15 while the other terminal thereof is connected to phase conductor $7^a$ on the network side of circuit breaker 31. In like manner voltage coils $10^b$ and $10^c$ are connected, respectively, to phase conductors $7^b$ and $7^c$ on the network side of circuit breaker 31 and to the ground 15. An impedance 38, shown as a resistance, is inserted between voltage coil $10^a$ and the network, and similarly resistances 39 and 40 are shown in circuit with voltage coils $10^b$ and 10ᶜ, respectively. The connection of the potential coils to the network through an impedance is to avoid a condition of lack of sufficient excitation for the potential coils when closing on a deenergized network. Otherwise, if the impedance of the network load is low, as compared to the impedance of the voltage coil, a condition may arise in which the load circuit will shunt most of the current from the voltage coil. The current coil 11ᵃ is connected across the secondary of current transformer 8ᵃ and is also connected in a circuit across the switch terminals in phase conductor 7ᵃ through a resistance 16ᵃ and resistance 38 by conductors 32 and 33. In like manner, current coils 11ᵇ and 11ᶜ are connected, respectively, across the secondaries of current transformers 8ᵇ and 8ᶜ, and also across the switch terminals in phase conductors 7ᵇ and 7ᶜ through resistances 16ᵇ and 39 and resistances 16ᶜ and 40 respectively by conductors 34 and 35, and 36 and 37. Circuit breaker 31 is provided with closing and opening means shown as comprising a closing coil 19, and an opening coil 20 having a plunger 21 to disengage a latch 22 which holds the breaker closed when it is desired to have the distribution transformer connected to the network. Circuit breaker 31 is also provided with a contact 23 having contact points 24 and 25 to provide a control for completing a circuit for the opening or closing coils when the circiut breaker is in the closed or open position.

The operation of the arrangement shown in Fig. 2 is essentially the same as that shown in Fig. 1 and the various circuit conditions at different points of the cycle operations will be apparent from the description previously given with respect to the single-phase distribution system. It will be observed that when contact 12ᵃ, 12ᵇ, or 12ᶜ takes a position so as to bridge the contact point 14ᵃ, 14ᵇ, or 14ᶜ, a circuit will be completed for the opening coil 20, so that the operation of any one of the relays will be instrumental in disconnecting the secondary of the distribution transformer from the network. On the other hand, the contact points 13ᵃ, 13ᵇ, and 13ᶜ of the respective relays, are in series relation necessitating operation of all relays in order to complete a circuit for the closing coil 19. This insures the proper voltage conditions on all three phases before it is possible to connect the distribution transformer to the network.

It will be obvious to those skilled in the art that changes and modifications may be made in the construction and arrangement of parts without departing from my invention and it will be obvious that my invention is not limited to the interconnection of circuits utilizing a power transformer between the circuits, and I, therefore, aim in the appended claims to cover all such changes and modifications as fall within the true spirit and scope of my invention.

What I claim as new and desire to secure by Letters Patent of the United States is:

1. A transformer circuit controlling system for alternating-current networks wherein a switch is provided for connecting and disconnecting the secondary of the transformer and the network, including in combination a directional relay provided with a voltage coil and a current coil, an impedance in series relation with said voltage coil in a circuit to said network, an inductive apparatus connected in series with said switch, an impedance connected in a circuit from said current coil to said network, through said first mentioned impedance, said current coil being connected respectively in a circuit in shunt to said inductive apparatus and in a circuit across said switch in series with said first mentioned impedance and said second mentioned impedance whereby when said switch is closed said current coil is energized in accordance with the direction of current flow in said inductive apparatus, and whereby when said switch is open said current coil is directly energized in accordance with the difference in magnitude and phase of the voltage between the transformer secondary and the network.

2. A transformer circuit controlling system for polyphase alternating-current networks wherein a switch is provided for connecting and disconnecting the secondary of the transformer and the network, including in combination a directional relay for each phase conductor provided with a voltage coil and a current coil, an impedance connected in a circuit between each of said voltage coils and the network, a resistance connected in a circuit from each of said current coils to a point between an impedance and the voltage coil connected thereto, each of said current coils being connected in series with one of said resistances and impedances across the switch terminals of its respective phase conductor and cooperating with its voltage coil to operate a relay for effecting the closing of said switch upon the operation of all relays when current flow is from said transformer secondary to the network, and a current transformer connected in series relation with the switch in each phase conductor adapted to energize a current coil of a relay when said switch is closed whereby said current coil cooperates with its voltage coil to operate a relay for effecting opening of said switch upon the operation of any one relay when current flow is from said network to said transformer secondary.

3. In combination, a power transformer, an alternating current network, means for supplying alternating current to the primary of said transformer, switching means between the secondary of said transformer and said network, and means for controlling the operation of said switching means including an inductive apparatus connected in series with said switching means, an impedance, and a directional relay having a voltage coil permanently connected in series with said impedance across said network, and a current coil connected so as to be energized in accordance with current flowing through said inductive apparatus when said switching means is closed and directly connected with said impedance in a series circuit between the secondary of said transformer and the network when said switching means is open.

In witness whereof, I have hereunto set my hand this 7th day of December, 1925.

DAVID K. BLAKE.